United States Patent [19]
Lösing et al.

[11] Patent Number: 4,986,123
[45] Date of Patent: Jan. 22, 1991

[54] HOLDER FOR THIN ELECTRICAL RESISTANCE SENSORS OF AN AIR FLOW MEASURING DEVICE

[75] Inventors: Karl-Heinrich Lösing, Wesel; Walter Schauer, Neuss, both of Fed. Rep. of Germany

[73] Assignee: Pierburg GmbH, Neuss, Fed. Rep. of Germany

[21] Appl. No.: 389,368

[22] Filed: Aug. 3, 1989

[30] Foreign Application Priority Data

Aug. 4, 1988 [DE] Fed. Rep. of Germany ....... 3826483
May 16, 1989 [DE] Fed. Rep. of Germany ....... 3915872

[51] Int. Cl.$^5$ .............................................. G01F 1/68
[52] U.S. Cl. .................................. 73/204.26; 73/118.2
[58] Field of Search ........... 73/204.19, 204.22, 204.25, 73/204.26, 204.23, 118.2

[56] References Cited

U.S. PATENT DOCUMENTS

| | | | |
|---|---|---|---|
| 4,594,889 | 6/1986 | McCarthy | 73/204.26 |
| 4,677,850 | 7/1987 | Miura et al. | 73/204.23 |
| 4,841,769 | 6/1989 | Porth et al. | 73/204.26 |
| 4,870,860 | 10/1989 | Ohta et al. | 73/204.26 |

*Primary Examiner*—Herbert Goldstein
*Attorney, Agent, or Firm*—Ladas & Parry

[57] ABSTRACT

An air flow sensor and a temperature sensor of a device for measuring air flow in the intake manifold of an internal combustion engine are mounted in parallel relation to one another in a plane of a flat holder member. The sensors are secured to the holder member in fixed manner by adhesives. The mounting of the sensors on the holder can be achieved by mass production with the sensors aligned in the common plane in parallel relation to one another. In one embodiment the sensors are secured to the upper and lower legs of a rectangular frame with an intermediate leg of the frame disposed between the sensors.

10 Claims, 2 Drawing Sheets

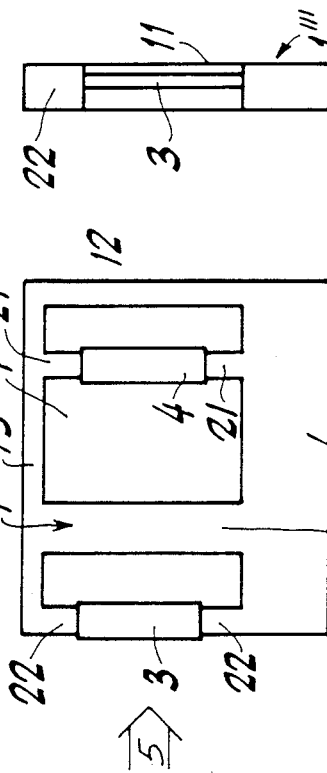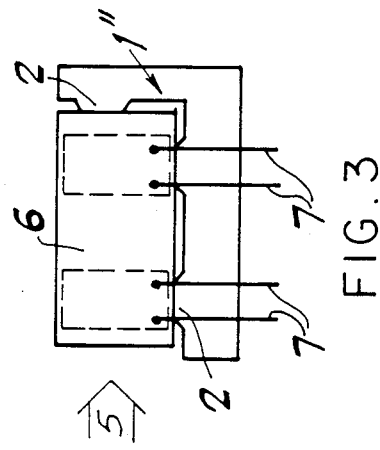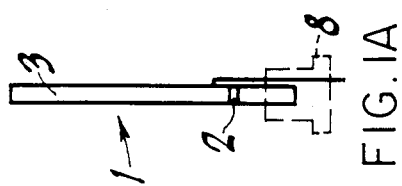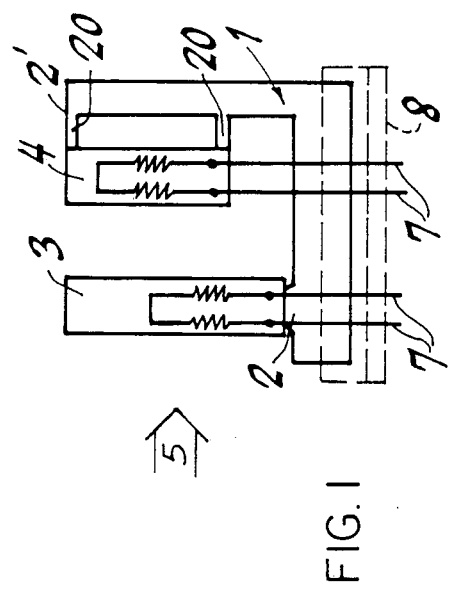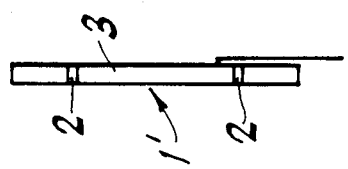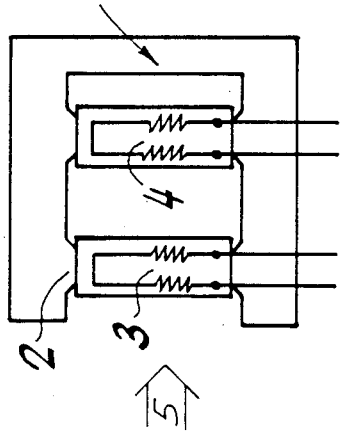

HOLDER FOR THIN ELECTRICAL RESISTANCE SENSORS OF AN AIR FLOW MEASURING DEVICE

FIELD OF THE INVENTION

The invention relates to a holder for supporting a flat sensor having electrical resistance means thereon in the form of a thin layer for the measurement of air flow in the intake manifold of an internal combustion engine.

DESCRIPTION OF PRIOR ART

DE-OS No. 2,914,275 discloses several embodiments of a holder in an air flow measurement device, which consists of a temperature sensor and an air flow sensor. The measurement function, per se, is known in the art. In all sensors of this type, reproducibility and uniformity of the measurement results for a mass produced product has considerable effect on the usability of the product, particularly with regard to the use of the signal in determining the quantity of fuel to be supplied to a gasoline engine of a motor vehicle under fluctuating conditions of operation.

It has been determined from numerous tests that the arrangement of the sensors for measuring temperature and air flow behind one another in the direction of flow, and in which the sensors are separately constructed as two heat insulative ceramic carriers with respective electrical circuit means thereon for technological conditions of manufacture, is of considerable importance as regards the accuracy of the measurement results.

SUMMARY OF THE INVENTION

An object of the invention is to provide a holder for an air flow sensor and a temperature sensor which assures the accuracy of the measurement results even when mass produced.

The above and further objects of the invention are achieved by a construction of a holder which comprises a flat holder member and means for fixedly securing an air flow sensor and a temperature sensor on the holder member one after the other in a common plane parallel to the direction of air flow in which plane the sensors are disposed parallel to one another.

It is assured by means of the invention that the sensors i.e. each of their carriers always lies parallel in a common plane and thus are not subjected to different air streams. This also requires an arrangement of the holder member in parallel alignment in the air flow in an air inlet duct. This presents no problems as regards technical manufacture, due to the larger structural dimensions of the holder, in contrast with the alignment of the carriers of the sensors, which are only a few square millimeters in size. The holder member is made from a poor heat conducting material, such as a ceramic material and it can be of L or U shape or any other suitable form, such a a closed frame. The thickness of the holder corresponds, in one embodiment, approximately to the thickness of the carrier. The holder includes connecting portions which are reduced in cross section for joining the sensors to the holder in order to reduce heat transfer..

In one embodiment, the holder member is formed as a closed frame for increasing its intrinsic stability. The frame may be entirely or in part thicker than the carriers which it supports. In this way, a swirling air flow is produced, whereby sensitivity due to deviations in alignment and angle positions of the carriers with respect to each other is reduced. Contamination of the carriers is thus also reduced by the swirling of the air flow.

BRIEF DESCRIPTION OF THE FIGURES OF THE DRAWING

FIG. 1 Is a side elevational view of a holder member according to the invention holding two sensors for measuring air flow.

FIG. 1A is an end elevational view of the holder member in FIG. 1.

FIG. 2 is a side elevational view of another embodiment of the holder member.

FIG. 2A is an end elevatioanl view of the holder member in FIG. 2.

FIG. 3 is a side elevational view of another embodiment of the holder member.

FIG. 3A is an end elevational view of the holder member in FIG. 3.

FIG. 4 is a side elevational view of another embodiment of the holder member.

FIG. 4A is an end elevational view of the holder member in FIG. 4.

DETAILED DESCRIPTION OF PREFERRED EMBODIMENTS

FIG. 1 shows a first embodiment of a holder member 1 having connection means 2 and 2' respectively supporting sensors 3, 4 for measuring the mass rate of flow of an air stream 5, for example, in the intake manifold of an internal combustion engine.

The holder member 1 is made from an electrically insulative material such as a ceramic. The connection means 2' comprises spaced, narrow connecting elements 20 which serve to minimize the area of connection of the sensor 4 to the holder member 1. The connection means 2 is in the form of a narrow projection which also serves to minimize the area of contact of sensor 3 to the holder 1. The attachment of the sensor 4 to the connecting elements 20 and of the sensor 3 to the connection means 2 is effected by conventional adhesives. Sensors 3 and 4 are formed conventionally as flat, insulative carriers serving as a support for electrical resistance means applied as a layer on the carrier to undergo change in values in response to temperature and rate of air flow respectively.

The holder member 1 supports the flat sensor 4 after the sensor 3 in the direction of air flow 5 in an arrangement in which the sensors are disposed in a common plane parallel to the direction of air flow and parallel to one another in this common plane. Instead of being individually supported by respective connection means, the sensors 3, 4 can be integrated into a common carrier 6 as shown in FIG. 3.

The sensors are connected by electrical leads 7 to external circuits (not shown) which process the signals and produce output values representing mass rate of air flow.

After the sensors 3, 4 have been attached to the holder member 1, the holder member can be joined by injection molding with a support 8 shown in dotted outline in FIGS. 1 and 1A by which the assembly of the holder member and sensors can be secured in the intake manifold in a plane parallel to the direction of air flow with the sensors extending parallel to the direction of air flow and parallel to one another.

In FIG. 1, the holder member 1 is formed with two legs at right angles in the shape of L to secure the sensors 3, 4 from a respective leg. In FIGS. 2 and 2A a third leg is added so that the holder member is of U-shape and each sensor is held at its end by parallel legs of the U-shaped holder member 1'. This embodiment provides greater support for the sensors compared to that in FIG. 1. FIG. 3 shows the holder member 1'' as being of L-shape and supporting the common carrier 6 by three connection means 2.

In FIG. 4, the holder member 1''' is formed as a closed octangular frame having front and rear legs 11, 12 and upper and lower legs 13, 14 defining an interior opening 9 into which project a pair of narrow connecting elements 21 which hold the sensor 4 in the plane of the holding member and also in the plane of the airflow. The second sensor 3 is also held in the plane of the holder member parallel to the sensor 4 by two narrow projecting elements 22 extending from upper and lower legs 13, 14. The leg 11 extends between sensors 3 and 4 and is thicker than the sensors. The entire frame may be correspondingly thicker than the sensors as shown in FIG. 4A and the sensors are confined within the thickness of the frame. Thereby the air flow is deflected and the sensitivity of the electrical resistance elements on the carriers with respect to deviations in alignment of the respective carriers is reduced, while additionally the risk of fouling of the sensors is also reduced.

The sensors 3, 4 are secured to the holder member 1, 1', or 1''' in a manner which is free of angular error and misalignment by common mounting in the plane of the planar holder member, optionally by supplemental supports as shown in FIGS. 2, 2A and 4, 4A or by central mounting in the thicker holder member 1''', and the sensors are adhesively secured to the holder member. The mounting of the sensors on the holders can be readily automated.

The invention has been disclosed with respect to several embodiments and it will be come apparent to those skilled in the art that various modifications and variations can be made within the scope and spirit of the invention as defined in the attached claims.

What is claimed is:

1. A holder device for apparatus for measuring air flow in the intake manifold of an internal combustion engine, the apparatus comprising an air flow sensor and a temperature sensor, each sensor comprising a flat carrier of electronically insulative material and electrical circuit means on said carrier, said holder device comprising a flat holder member constructed separately from said sensors and means for fixedly securing said air flow sensor and said temperature sensor on said holder member one after the other in a common plane parallel to the direction of air flow with the sensors disposed in said common plane, said holder member comprising a closed frame which can be disposed in the air flow and which includes upper and lower legs and front and rear spaced legs defining an interior opening bounded by said upper, lower, front and rear legs, means extending from said upper and lower legs in front of said front leg for engaging the carrier of one of said sensors to secure said one sensor to said frame in front of said front leg, and means projecting into said interior opening between said front and rear legs for engaging the carrier of the other of said sensors to secure said other sensor to said frame between said front and rear legs, said front leg being disposed between said sensors and having a thickness greater than that of said sensors, said common plane which contains said sensors being disposed within the thickness of said front leg.

2. A holder as claimed in claim 1 wherein said means for fixedly securing the sensors includes narrow projecting elements on said holder member engaging the sensors.

3. A holder as claimed in claim 1 wherein said closed frame has a thickness greater than that of said sensors.

4. A holder as claimed in claim 1 wherein said closed frame is rectangular.

5. A holder as claimed in claim 1 wherein said holder member is thicker than said sensors.

6. A holder as claimed in claim 1 wherein said sensors are disposed parallel to one another in said common plane.

7. A holder as claimed in claim 1 wherein said holder member is made of electrically insulative material.

8. A holder as claimed in claim 7 wherein said electrically insulative material is a ceramic.

9. A holder device as claimed in claim 1 wherein each of the means for securing the respective sensor to the frame comprises narrow connecting elements projecting from the respective legs of the frame for connecting the carrier of the respective sensor and adhesive means securing said connecting elements to said carrier.

10. A holder device for apparatus for measuring air flow in the intake manifold of an internal combustion engine, the apparatus comprising an air flow sensor and a temperature sensor, each sensor comprising a flat carrier of electrically insulative material and electrical circuit means on said carrier, said holder device comprising a flat holder member and means for fixedly securing said air flow and said temperature sensor on said holder member one after the other in a common plane parallel to the direction of air flow with the sensors disposed in said common plane, said holder member including two legs at right angles to one another to form an L-shape for said holder member, each sensor being fixedly secured to a respective leg of said holder member.

* * * * *